Dec. 17, 1957       R. E. KRUEGER       2,816,561
PRESSURE REDUCING VALVE
Filed Aug. 11, 1952                                  4 Sheets-Sheet 1

REFERENCE PRESSURE
(ANEROID OR AMBIENT)

INVENTOR.
RUDOLPH E. KRUEGER
BY
ATTORNEY

Dec. 17, 1957  R. E. KRUEGER  2,816,561
PRESSURE REDUCING VALVE
Filed Aug. 11, 1952  4 Sheets-Sheet 2

INVENTOR.
RUDOLPH E. KRUEGER
BY
*James B Christie*

ATTORNEY

Dec. 17, 1957     R. E. KRUEGER     2,816,561
PRESSURE REDUCING VALVE

Filed Aug. 11, 1952     4 Sheets-Sheet 3

INVENTOR.
RUDOLPH E. KRUEGER

BY
*James B. Christie*

ATTORNEY

Dec. 17, 1957  R. E. KRUEGER  2,816,561
PRESSURE REDUCING VALVE
Filed Aug. 11, 1952  4 Sheets-Sheet 4

INVENTOR.
RUDOLPH E. KRUEGER
BY
ATTORNEY

United States Patent Office 2,816,561
Patented Dec. 17, 1957

2,816,561

PRESSURE REDUCING VALVE

Rudolph E. Krueger, Burbank, Calif., assignor to Wallace O. Leonard, Inc., Pasadena, Calif., a corporation of California Application August 11, 1952, Serial No. 303,770

4 Claims. (Cl. 137—81)

This invention relates to a pressure reducer valve characterized by two interrelated control stages and adapted to deliver an accurate downstream, regulated pressure under varying conditions of flow rate and inlet pressure.

In turbine actuated instruments, in rocket engine fuel control apparatus and in many other forms of industrial instrumentation and control, the volume discharge or amount of energy desirable is proportional to the pressure differential maintained across a metering orifice or nozzle. To insure uniform operation, therefore, accurate regulation of such pressure differential is required.

In a conventional pressure reducer valve a spring loaded throttle valve operates against a diaphragm or bellows which in turn is loaded responsive to a reference pressure. The reference pressure may be ambient or may be a controlled pressure as achieved, for example, by the medium of an evacuated bellows. Such an evacuated bellows is herein referred to as an aneroid bellows and a reference pressure so achieved, as an aneroid reference pressure. At present, two-stage pressure reduction can be achieved by serial arrangement of two valves so that the pressure differential ($\Delta p$) across the second stage valve is determined by the first stage valve. In the arrangement, both the first and second stage valves are independently provided with reference pressure. As a consequence any controlled change in delivery pressure requires not only adjustment of the reference pressure on the second stage valve but also separate adjustment of the reference pressure on the first stage valve. This, in turn, involves repeated manipulation of two adjustments to maintain a substantially uniform $\Delta p$ across the second stage valve and to arrive at the desired delivery pressure.

I have now developed a pressure reducer valve which includes two stages within a single housing and which is characterized by inherent or automatic regulation of the $\Delta p$ across the second stage so that equilibrium is maintained with any change in delivery pressure responsive to variation of a single reference pressure. This is made possible by utilizing the delivery pressure from the second stage as a reference pressure for the first stage with the consequence that any variation in the second stage reference pressure affects the delivery pressure and thereby varies the pressure drop across the first stage to the extent necessary to maintain the pressure drop across the second stage substantially constant.

The purpose of such two-stage regulation is to accomplish very accurate control, which is only attainable if the $\Delta p$ across the final control is substantially constant. Under these conditions, the second stage may be made more sensitive than if it was exposed to a large or a variable pressure drop. For this purpose the present valve is superior to any presently available means for accomplishing the same ends for the reason that the critical $\Delta p$ across the second stage is automatically maintained at a relatively small and constant value throughout the entire range of inlet pressures and controlled outlet pressures and through a wide range of flow rates.

In the accomplishment of this objective, the invention contemplates a pressure reducing valve adapted to deliver a fluid at a determinable outlet pressure throughout a wide range of fluid inlet pressures lying above the outlet pressure which comprises first and second pressure reducing stages, the first stage including a first throttle valve driven as a function of the differential between an intermediate pressure and the outlet pressure to pass a fluid to the second pressure reducing stage, the second stage including a second throttle valve driven as a function of the differential between a reference pressure and the outlet pressure to pass fluid from the first pressure reducing stage to outlet. The intermediate pressure is that existing in the downstream side of the first reducing stage.

In the valve as described above, any change in the reference pressure automatically changes the outlet pressure. At the same time, the change in outlet pressure affects the equilibrium of the first throttle valve which is driven as a function of the differential between the intermediate pressure and the outlet pressure, the change in equilibrium being such as to vary the intermediate pressure to the same differential. In this manner the first control stage delivers to the second control stage a pressure which varies with the controlled outlet pressure so that the pressure differential across the second throttle valve will remain substantially constant. As a result the $\Delta p$ across the second stage automatically seeks a uniform equilibrium value with each variation of the reference pressure and without additional adjustment. The outlet pressure, therefore, varies with the reference pressure to maintain a constant differential.

As mentioned above, the reference pressure may be ambient pressure or a controlled pressure. If ambient pressure is reference, then the outlet pressure will be held at a given differential with respect to ambient pressure irrespective of variations of the latter with altitude, temperature, etc. and without requiring any adjustment in the valve. A controlled reference pressure may be achieved, for example, by means of an evacuated bellows and may be varied by adjustment of the mechanical loading of the bellows, the valve functioning to deliver an outlet pressure having a constant relationship with the controlled pressure. Any source of reference pressure may be employed.

The invention will be more clearly understood by reference to the accompanying drawing in which.

Figure 1:
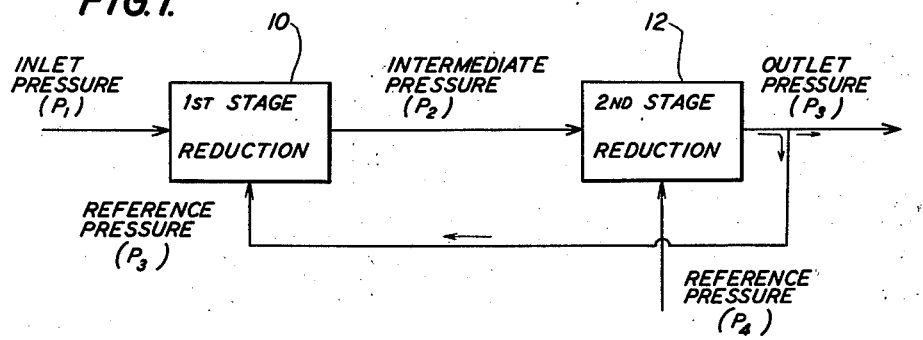
Fig. 1 is a schematic diagram illustrating the principle of operation of the valve of the invention.

Referring to Fig. 1 of the drawing, any of the embodiments of the invention may be explained on the basis of the diagram there presented. The valve includes a first reduction stage 10 and a second reduction stage 12. Fluid delivered to the first reduction stage at an inlet pressure $P_1$ is delivered from the first to the second reduction stage at an intermediate pressure $P_2$ and is delivered from the second reduction stage at a controlled outlet pressure $P_3$. A reference pressure $P_4$ is applied to the second reduction stage 12 to control the operation thereof and to maintain the desired differential between the pressures $P_2$, $P_3$. The pressure $P_3$ is applied as a reference pressure to the first reduction stage 10 to control the intermediate pressure $P_2$.

With a given intermediate pressure $P_2$, any variation in reference pressure $P_4$ will automatically tend to vary the outlet pressure $P_3$. However, any variation in the outlet pressure $P_3$ will affect the equilibrium of the first reduction stage to which it is a reference, so as to vary the intermediate pressure $P_2$ in such a fashion that the differential $P_2$ minus $P_3$ ($\Delta p$ across second stage) is maintained substantially constant throughout any variation in reference pressure $P_4$.

The first reduction stage operates as a function of the differential of the pressure $P_2$ and $P_3$ as related to the inlet pressure $P_1$ so that the intermediate pressure $P_2$ is substantially insensitive to variations in the inlet pressure $P_1$ and is sensitive principally to variations only in the outlet pressure $P_3$ as determined in turn by variations in the reference pressure $P_4$. For this reason the outlet pressure is varied only responsive to the single reference pressure $P_4$, the outlet pressure being substantially insensitive to changes in inlet pressure, and the pressure drop across the second reduction stage being likewise substantially insensitive to variation in inlet pressure. It is for this reason that the second reduction stage can be made very sensitive since it is subjected only to a relatively small and substantially uniform pressure drop. As a consequence of this sensitivity, the outlet pressure may be held to very close tolerances over a wide range of inlet pressure and flow volume.

Figure 2:
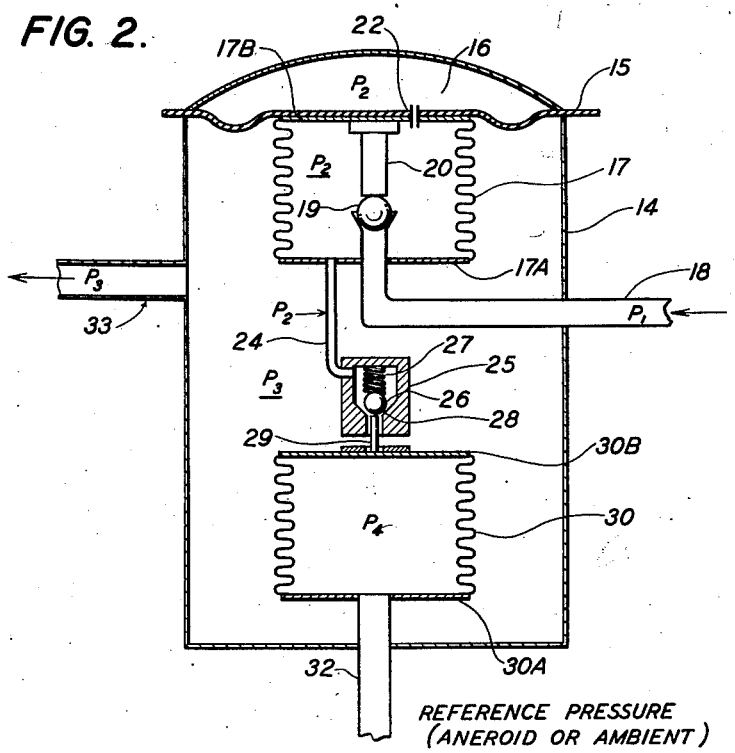
Fig. 2 is a simplified diagram showing the basic elements of a valve in accordance with the invention.

Fig. 2 is a schematic diagram of a valve in accordance with the invention showing operationally the principles illustrated empirically in Fig. 1. The valve comprises a housing 14 with a diaphragm 15 sealed across one end to define a cavity 16. A seal bellows 17 is mounted with its base 17A held in a rigid position and its upper end 17B being responsive to displacement of the diaphragm 15. An inlet line 18 opens into the bellows 17, flow therethrough being controlled through a throttle valve 19. A pin 20 depends from the upper end of the bellows 17 to engage the throttle valve 19 controlling its position responsive to deflections of the diaphragm 15. Diaphragm 15 is ported at 22 to give access between the interior of the bellows 17 and the chamber 16 defined by the diaphragm.

A line 24 communicates between the interior of the bellows 17 and a second throttle valve housing 25. A valve 26 is spring loaded by a spring 27 against a seat 28 in the housing 25 and against a pin 29 extending from a second bellows 30. The lower end 30A of the bellows 30 is affixed to a shaft 32 and is positioned thereby. The upper end 30B of the bellows is positioned as a function of variations in the pressure differential across the bellows. The pressure $P_4$ is reference pressure and may be ambient as applied through the shaft 32. Alternatively, the bellows 30 may be evacuated and sealed so that the reference pressure $P_4$ is a function of the compression of the bellows effectuated by longitudinal adjustment of the shaft 32. In either event, the relationship between delivery pressure and reference pressure is determined by the bellows loading as accomplished by adjustment of the supporting shaft. The throttle valve 26 gives access to the interior of the housing and an outlet line 33 provides for delivery of fluid at the controlled delivery pressure.

Considering the apparatus of Fig. 2 with respect to the diagram of Fig. 1, inlet pressure $P_1$ acts against the throttle valve 19 in opposition to a force applied by the pin 20, this force in turn being a function of the pressure differential $P_2$ minus $P_3$ across the diaphragm 15 together with the loading of the bellows 17. The area of the diaphragm is considerably greater than the area of the bellows, with a consequent result that the principal motivating force on the diaphragm is a function of the ratio $P_2/P_3$. Under the influences above mentioned, the throttle valve 19 admits inlet fluid into the bellows from whence it communicates to the chamber 16 through the port 22 so that a pressure $P_2$ is maintained in the bellows and in the chamber 16. This pressure $P_2$ is applied against the second throttle valve 26 through the conduit 24. The position of the second valve is a function of the force of the loading spring 27 as opposed to the force developed at the pin 29 responsive to the differential betweeen reference pressure $P_4$ and outlet pressure $P_3$.

The function $P_2/P_3$ is dependent upon the spring loading of diaphragm 15. This loading may be accomplished by an ordinary spring or by the inherent spring characteristics of seal bellows 17 as illustrated. The spring loading and resultant pressure characteristics are selected to be optimum for the operation of the second stage valve, valve 26 in Fig. 2.

Any change in $P_4$ will affect the contraction or expansion of the bellows 30 and hence the opening of the throttle valve 26 with respect to a given $P_2$. This in turn will affect the outlet pressure $P_3$ accordingly, which, as a consequence, will disturb the pressure differential across the diaphragm 15. The diaphragm will react to this variation in pressure differential to vary the setting of the throttle valve 19 so as to vary $P_2$ to return the equilibrium betweeen the $P_2$ and $P_3$.

The valves shown in greater detail in Figs. 3 to 7 are the same in principle as the valve shown schematically in Fig. 2.

Figure 3:
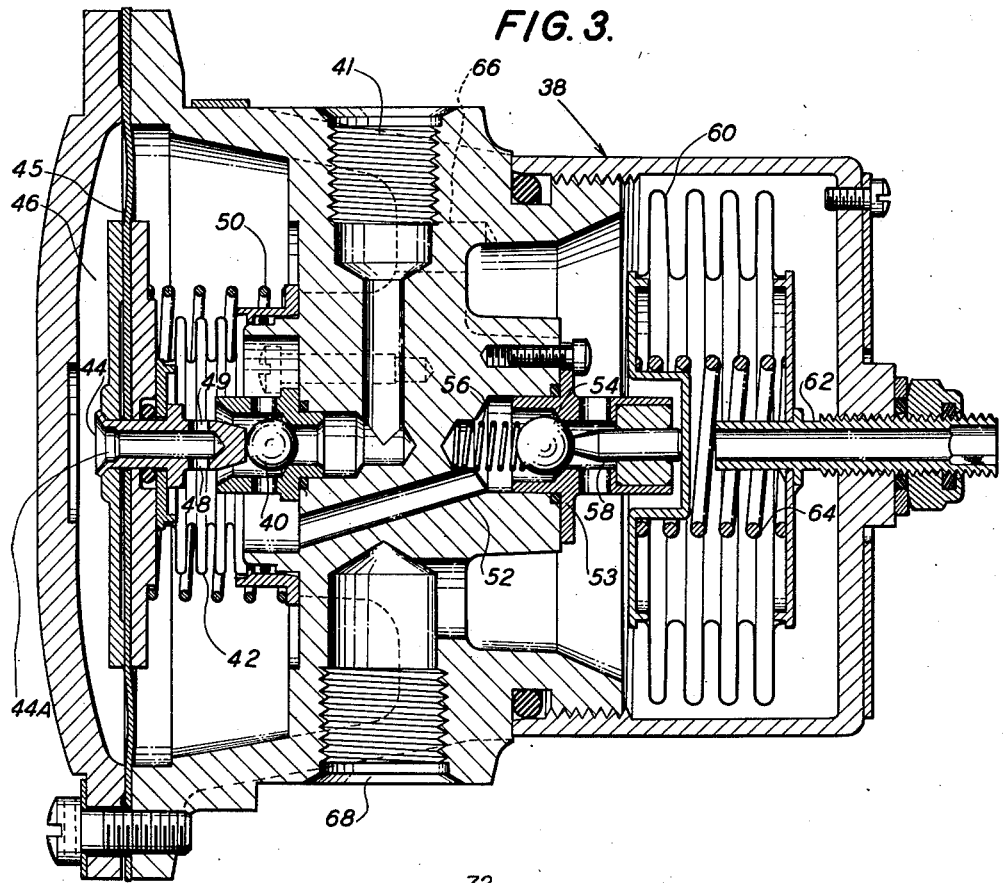
Fig. 3 is a detailed sectional elevation of one embodiment of the invention provided with ambient reference pressure.

Referring to Fig. 3, the valve there shown is retained within a housing 38. A throttle valve 40 is disposed between an inlet line 41, opening exteriorly of the housing, and the interior of a first bellows 42. The valve is controlled by a pin 44 driven by a diaphragm 45, sealed across the housing to define a chamber 46. Fluid flows from the interior of the bellows into the chamber 46 through ports 48, 49 giving access to a central bore 44A in the pin 44. In practice, the diaphragm is spring loaded with a spring 50 to achieve the desired operating characteristics. Fluid flows from the bellows 42 through a conduit 52 formed within the housing to a second throttle valve housing 53 wherein a throttle valve 54 controls the flow through a defined passageway and into the body of the valve housing. The valve 54 is spring loaded with a spring 56 which opposes the force applied by a pin 58, the pin 58 in turn being driven responsive to expansion and contraction of a bellows 60. In this particular embodiment the bellows 60 has access through a conduit 62 to ambient pressures exteriorly of the valve housing, the conduit 62 being longitudinally adjustable to vary the compression of a spring 64 loading the bellows. Fluid flowing past the throttle valve 54 and into the housing gains access to the region below the diaphragm 45 through one or more conduits, one such conduit 66 being shown in dotted lines. The escaping fluid at the same time flows through an outlet opening 68.

All of the mechanisms of the valve are enclosed within the single housing 38 for compactness and manufacturing facility. The details of construction of the valve with respect to bushings, sealing rings and the like are in no way limiting, nor are they important to the understanding of the invention and hence are not considered herein. The valve of Fig. 3 is a commercial operating valve, the principles of operation being identical with the valve shown schematically in Fig. 2.

Figure 4:
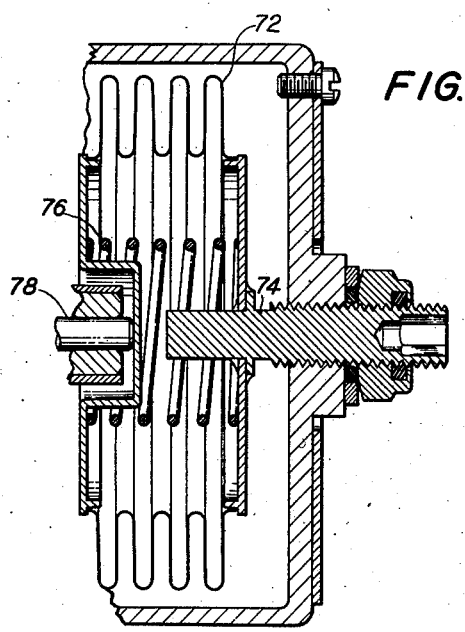
Fig. 4 is a sectional elevation through a portion of a valve similar to that of Fig. 3 showing aneroid reference pressure.

The valve shown in partial elevation in Fig. 4 is, except to the extent illustrated, similar to the valve of Fig. 3, differing therefrom only in that the reference pressure, as applied to the second stage bellows is a partial vacuum of say about 0.05" Hg or better and not ambient pressure. A high degree of vacuum is desirable to reduce temperature errors. In Fig. 4 the second stage bellows 72, corresponding in function and location to the second stage bellows 60 in the valve of Fig. 3, is sealed and evacuated, adjustment of the reference pressure being accomplished in this instance by longitudinal adjustment of a pin 74 threaded through an exterior wall of the housing. The bellows 72 is spring loaded with an interiorly disposed helical spring 76 and drives a throttle valve control pin 78 which engages a throttle valve (not shown) in the manner of the pin 58 in the valve of Fig. 3.

In accordance with preferred practice, the adjusting pin 74 of the valve of Fig. 4 or the reference pressure conduit 62 of the valve of Fig. 3 are sealed through their respective bellows projecting interiorly thereof, and in so doing prevent complete collapse of the bellows in the event of any rapid and excessive pressure change across the bellows.

Figure 5:
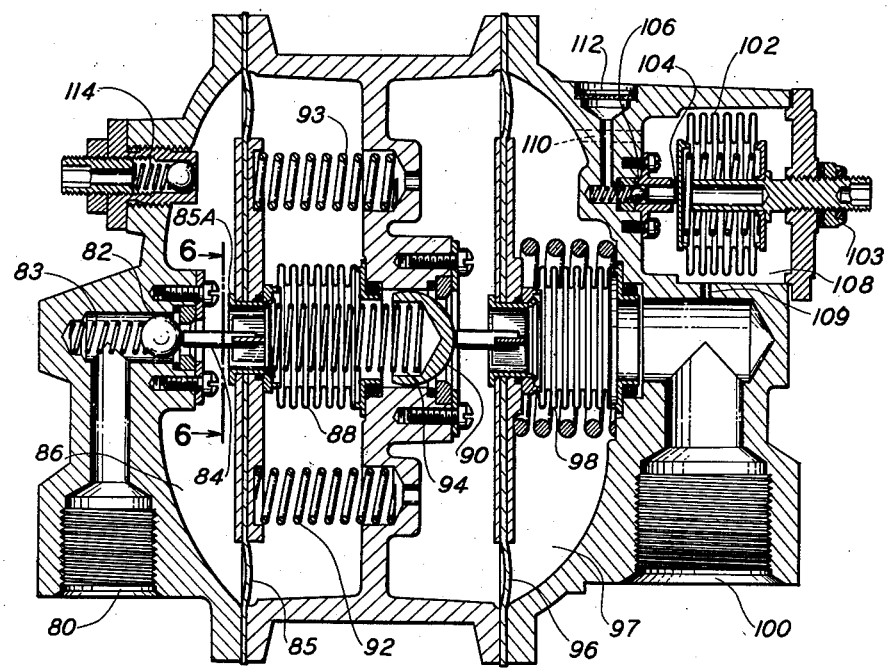
Fig. 5 is a sectional elevation through an alternative embodiment of the invention.

The valve shown in Fig. 5 differs in detail but not in principle from the valves heretofore described. In this valve two diaphragms are employed, one in each pressure reduction stage, the result being that this particular valve is perhaps more rugged and capable of greater flow rating and pressure differentials than the valve of Fig. 3, for example.

Referring to Fig. 5, inlet is through an opening 80 and against a first stage throttle valve 82. The valve 82 is spring loaded in one direction by a spring 83, opposed by a loading pin 84 which is in turn driven by a diaphragm 85. Referring to the same pressure designations as heretofore employed, the inlet pressure $P_1$ is applied against the inlet side of the valve 82, fluid passing through the valve entering a chamber 86 defined by the diaphragm at a pressure $P_2$ and flowing from this chamber into a bellows 88. The bellows 88 in this case serves no more than as an expansible conduit between the chamber 86 and a second stage throttle valve 90. The diaphragm 85 is spring loaded as in the foregoing embodiments, by a plurality of springs of which springs 92, 93 are shown in the drawing to achieve the desired operational characteristics of the diaphragm.

The second stage throttle valve 90 is spring loaded in one direction by a spring 94 and is loaded in the opposite direction by a second stage spring loaded diaphragm 96. The diaphragm 96 defines a second enclosed chamber 97 traversed by a bellows 98 giving access from the outlet of the second stage throttle valve to a valve outlet 100.

An aneroid reference pressure source is composed of an evacuated bellows 102 adjustable with a threaded stem 103 and operative through a depending pin 104 to operate a spring loaded throttle valve 106. The bellows 102 is located in a chamber 108 to which outlet pressure $P_3$ is admitted through a port 109 and from which reference pressure $P_4$ is introduced into the diaphragm chamber 97 through a port 110. Pressure $P_3$ entering the chamber 108 through the port 109 is bled to atmosphere through the throttle valve 106 at an outlet port 112 to the extent that the pressure $P_3$ exceeds the loading of the bellows 102 so as to contract the bellows and relieve the force on the pin 104. As a consequence a controlled pressure $P_4$ is bled from the reference chamber 108 into the bellows chamber 97.

A conventional pop off or safety valve 114 is sealed through a wall of the casing.

Figure 6:
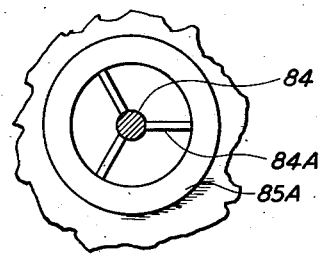
Fig. 6 is a detailed section taken on the line 6—6 of Fig. 5.

A detailed transverse section through the pin 84 which controls the operation of the first stage throttle valve 82 is shown in Fig. 6, the pin being supported by a spider 84A fastened to a grommet 85A affixed through the diaphragm 85.

Considering the operation of this valve, using the same pressure designations heretofore employed, it will be seen that its operation is identical in principle to the valves heretofore described. The operation of the first stage throttle valve is controlled by a diaphragm 85 responsive to an intermediate pressure $P_2$ in the chamber 86 and the outlet pressure $P_3$ existing in the main portion of the valve housing, i. e., on the opposite side of the diaphragm 85. The second stage control valve 90 is, as in the foregoing embodiments, operated as a function of the differential between the reference pressure $P_4$ in the chamber 97 and the outlet pressure $P_3$ in the larger region of the valve body. The first and second stage valves are therefore operative responsive to the same pressure conditions, as is the case in the foregoing valves, the difference in this instance being the use of diaphragms entirely to accomplish the control, the bellows 88 and 98 serving only as extensible conduits and not being loaded as a part of the operative feature of the valve. Spring loaded diaphragms, as herein employed, can be made quite rugged so that the valve of Fig. 5 can handle larger throughputs and greater pressure differentials than the more delicate bellows control valve of Figs. 3 and 4.

Figure 7:
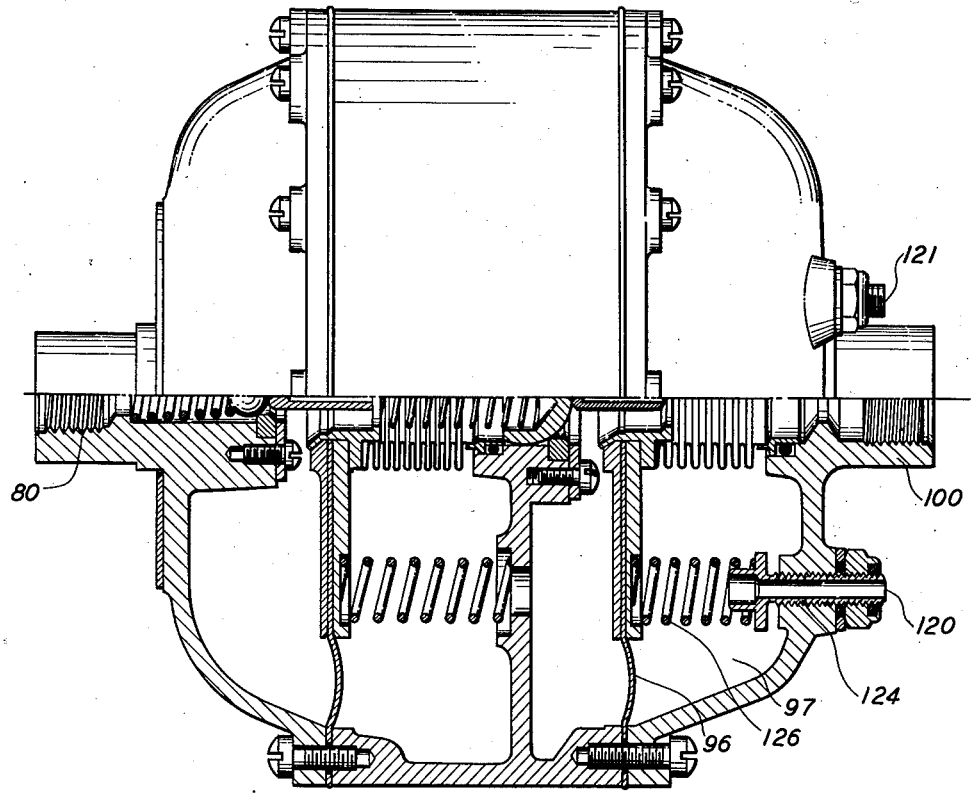
Fig. 7 is a partial sectional elevation through still another alternative embodiment of the invention.

The valve shown in sectional elevation in Fig. 7 is substantially identical to the valve of Fig. 5, differing therefrom only in provision of ambient pressure reference rather than controlled or aneroid pressure reference. The similarities in the valves are not repeated in the following description and like portions of the two valves are provided with like reference numerals. The second stage diaphragm 96 defines a second stage reference chamber 97 opened to ambient pressure through a plurality of ports 120, 121. The ports 120, 121 are through adjustable conduits, the conduit 124 defining the port 120 and bearing at its inner end on a spring 126 loading the diaphragm 96. Ports 120, 121 are illustrated as convenient access to ambient pressure. If it is desired to use a remote pressure for reference, a connecting conduit is very readily sealed through the housing wall. Relationship between outlet pressure and ambient pressure in this valve requires adjustment of each of the diaphragm loading springs associated with the several conduit means as described. Apart from this feature of ambient reference pressure and the fact that the inlet 80 and outlet 100 are in straight flow alignment, the valve of Fig. 7 is substantially identical to that of Fig. 5.

Figure 8:
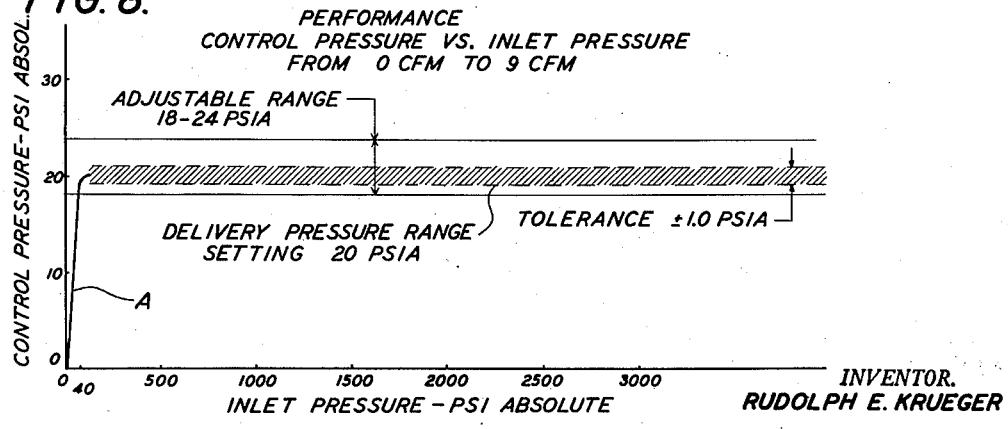
Fig. 8 is a performance graph of a valve in accordance with the invention showing delivery pressure range as a function of variations in inlet pressure over a wide range of flow rate.

The performance of the valve of the invention is illustrated in the graph of Fig. 8 wherein a curve A is a plot of delivery or control pressure as a function of variations in inlet pressure in pounds per square inch absolute as plotted on the ordinant of the graph and as varying between 0 and 3000 p. s. i. absolute. In obtaining the data of Fig. 8, flow through the valve was varied from 0 cubic feet per minute to 9 cubic feet per minute. The valve was set to deliver 20 pounds per square inch absolute and as inlet pressure was raised from 0 to about 40 pounds, the delivery pressure increased sharply from 0 to the shaded band identified as delivery pressure range. As inlet pressure is increased from 40 to 3000 pounds p. s. i. g. the delivery pressure holds within this range which includes a tolerance of plus or minus 1 p. s. i. a. from the set pressure. It is interesting to note the fact that delivery pressure within the tolerated range decreases with an increase in inlet pressure with a valve construction as illustrated in Fig. 3.

As inlet pressure increases in the indicated range, the throttle valve 40 exerts a force on the diaphragm 45 which is a function of the exposed area of the valve ball and the inlet pressure. The force thus exerted necessitates a counterbalancing increase in the $\Delta p$ across the diaphragm to achieve the control position of the valve. As a consequence the load on the second throttle valve is increased and the delivery pressure $P_3$ required to compress the second stage bellows 60 to a given central position is reduced. The performance curve of the valve of Fig. 5 shows the opposite slope for the reason that the first stage throttle valve is on the opposite side of its associated control diaphragm relative to the valve of Fig. 3.

I claim:

1. A pressure reducer valve comprising a housing defining a closed chamber, a flexible diaphragm sealed across the housing and defining a first substantially enclosed chamber located inside the housing, a first bellows affixed to the diaphragm exteriorly of the chamber with a port in the diaphragm opening into the bellows, an inlet conduit for fluid under pressure opening into the bellows, a first throttle valve in the inlet conduit, means controlling the first throttle valve responsive to movement of the diaphragm, a second throttle valve which discharges into the chamber which is defined by the housing, a passageway communicating between the bellows and second throttle valve with the inlet for the passageway being located adjacent the outlet of the first throttle valve and spaced from the diaphragm so that gas flowing from the first to the second throttle valve does not flow across the diaphragm, a second substantially enclosed chamber located inside the housing and defined by at least one flexible wall member, means for developing a reference pressure in the second chamber, means controlling the second throttle valve responsive to volume changes of the second chamber to pass fluid through the second throttle valve into the chamber which is defined by the housing exteriorly of the first and second chambers, and an outlet conduit for discharging fluid from the housing.

2. Apparatus according to claim 1 wherein the diaphragm has at least twice the area of the cross section of the bellows.

3. A pressure reducer valve comprising a housing defining a closed chamber, a diaphragm sealed across the housing adjacent one end thereof to define a substantially enclosed chamber, an inlet conduit opening through a wall of the housing, a bellows affixed at one end to the diaphragm and sealed at the other end around the conduit, a first throttle valve disposed in the inlet conduit, a pin depending from the diaphragm interiorly of the bellows and engaging the throttle valve to control the position thereof responsive to deflection of the diaphragm, means defining a passageway between the interior of the bellows and the interior of the chamber defined by the diaphragm, an intermediate conduit opening from the first bellows into the closed chamber which is defined by the interior of the housing, a second throttle valve in the intermediate conduit controlling fluid flow from the first bellows into the closed chamber which is defined by the interior of the housing, a second bellows, a shaft sealed through a wall of the housing and rigidly affixed to one end of the second bellows, the shaft being longitudinally adjustable to vary the position of said one end of the second bellows, a pin engaging between the opposite end of the second bellows and the second throttle valve to control the position of the second throttle valve responsive to displacement of said other end of the second bellows, an outlet conduit communicating between the closed chamber which is defined by the interior of the housing and the exterior thereof, and means for developing a reference pressure within the second bellows.

4. Apparatus according to claim 3 wherein the diaphragm is spring loaded against the pressure developed within the chamber defined thereby, and the second bellows is spring loaded by an interiorly disposed compression spring.

References Cited in the file of this patent
UNITED STATES PATENTS

| | | |
|---|---|---|
| 1,842,236 | Bastian | Jan. 19, 1932 |
| 1,898,226 | Taylor | Feb. 21, 1933 |
| 1,957,972 | Mills | May 8, 1934 |
| 2,002,884 | Deming | May 28, 1935 |
| 2,050,978 | Thatcher | Aug. 11, 1936 |
| 2,174,797 | Magnuson | Oct. 3, 1939 |
| 2,240,846 | Hanson | May 6, 1941 |
| 2,270,659 | Meyn | Jan. 20, 1942 |
| 2,306,060 | Jacobsson | Dec. 22, 1942 |
| 2,475,086 | Ensign | July 5, 1949 |
| 2,508,010 | Bower | May 16, 1950 |
| 2,642,701 | Goodner | June 23, 1953 |